United States Patent Office

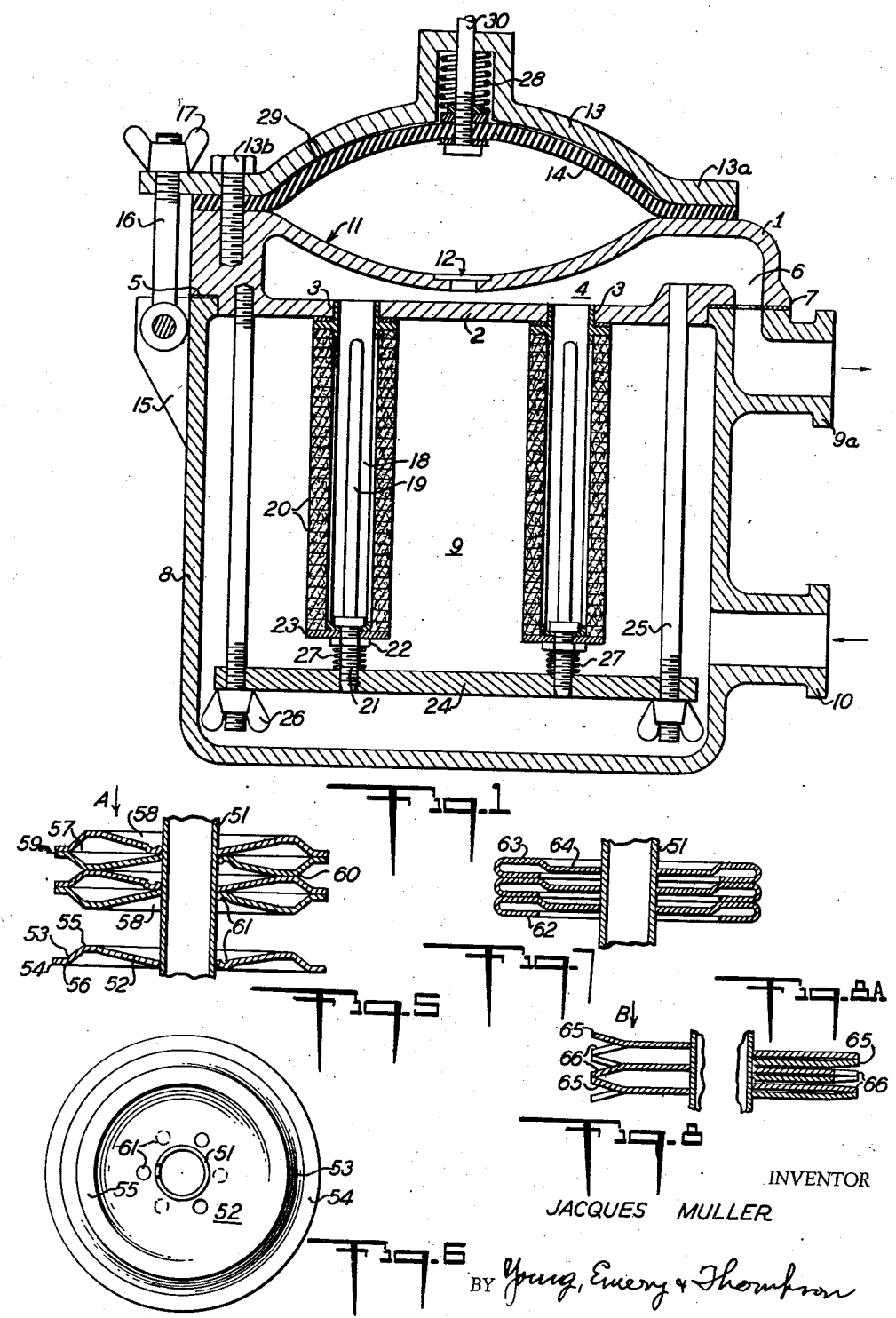

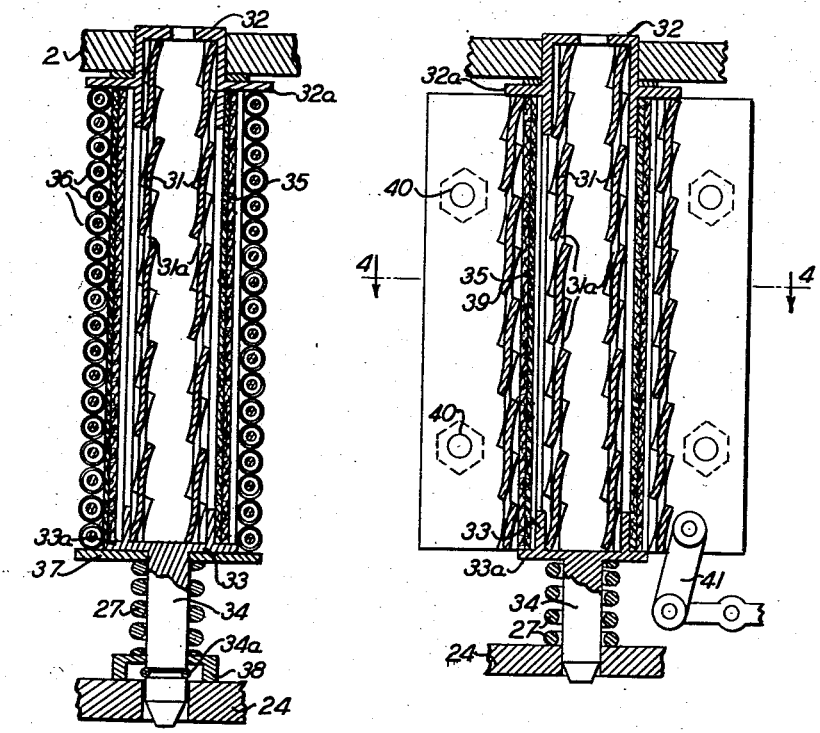
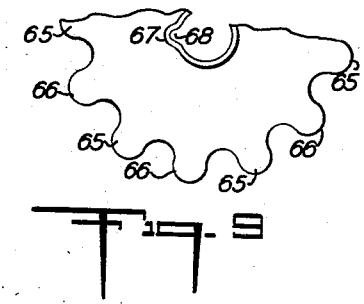

2,767,851
Patented Oct. 23, 1956

2,767,851

FLUID FILTER OF THE COLUMNAR TYPE

Jacques Muller, La Garenne-Colombes, France

Application May 27, 1953, Serial No. 357,762

Claims priority, application France May 30, 1952

8 Claims. (Cl. 210—152)

This invention relates to filters of the columnar type for filtering fluids, liquids or gases. The filter columns of filters of this type each consist of a stack of porous annular washers through which the filtering takes place radially from one circumferential edge to the other. Sealing between the consecutive washer of a column is assured by suitable axial clamping means. In conventional filters of the columnar type, the filter columns are attached to a removable hollow head on a filter casing and are under compression due to their natural elasticity under the action of a single washer of the clamping plate. Conventional filters of this type have various disadvantages mainly resulting from the necessity of cutting out the annular filter washers.

An object of the present invention is to overcome this disadvantage by substituting for a stack of washers, a filtering roll of paper, cardboard or like material formed by winding a sheet of material on a perforated tubular core. In this case, filtering takes place radially through the several superposed thicknesses of the sheet of filter material instead of radially from one circumferential edge to another. While having the same advantages as edgewise filtering, filtering through superposed layers according to the present invention gives the important further advantage of reducing the cost of manufacture of a filter column by the elimination of cutting out of the washers.

The filter roll or column according to the present invention is held on the perforated tubular core by any suitable means, for example, by means of elastic rings formed of annular springs, or semicircular clamping shells extending from one end to the other of the column and elastically clamping the filter roll.

Another object of the invention is to increase the resistance of filter columns of the kind mentioned against attack by certain fluids to be filtered, and also to facilitate or simplify cleaning of the filters.

For this purpose, the column of porous washers is replaced by columns formed of a stack of non-porous discs of metal or other solid and inert material, as far as possible elastic, profiled in such a manner that the contact between consecutive discs occurs at narrow annular surfaces prepared to form contact joints which are imperfectly sealed so as to permit passage of the fluid to be filtered while retaining the impurities.

The preparation of the peripheral contact surfaces may be effected in any suitable manner, particularly by abrasion or rubbing so as to form micrometric or capillary grooves or scratches extending from one edge to the other of the contact surfaces. The contact surfaces should, of course, be finished in such a manner that the contact takes place uniformly over all the circumferences of the discs without leaving any interstices except the grooves or scratches formed by the abrasion or rubbing. By making a suitable choice of the material of the discs, filter columns can be made which are resistant to the attack of any gas or liquid which it is desired to filter.

Other features of the invention will appear from the following detailed description and from the showing in the accompanying drawings, in which:

Figure 1 is a vertical sectional view through a filter of the columnar type;

Fig. 2 is an axial sectional view of a filter column according to the present invention;

Fig. 3 is an axial sectional view of a modification of the filter column of Fig. 2;

Fig. 4 is a sectional view taken on line 4—4 of Fig. 3;

Fig. 5 is a partial axial sectional view of a third embodiment of a filter column according to the invention;

Fig. 6 is a plan view of the filter column of Fig. 5;

Fig. 7 is a partial axial sectional view of a fourth embodiment;

Fig. 8 is a partial axial sectional view of a fifth embodiment of a filter column prior to axial compression;

Fig. 8a is a view similar to that of Fig. 8 showing the plates axially compressed;

Fig. 9 is a fragmentary detailed plan view of the filter column of Fig. 8.

As shown in Figure 1, a filter of the type to which the present invention relates comprises a casing or tank 8 in which the columnar filter elements are housed. The tank is provided with a removable closure in the form of a hollow head 1, the lower wall 2 of which is flat and is formed with a plurality of circular holes 3 communicating with the interior cavity 4 of the head. The lower surface of the lower wall of the head is provided around its periphery with a seat 5. At one portion the seat is widened and through this portion there extends an outlet passage 6 communicating with the cavity 4. By means of seat 5 the head 1 is mounted, with interposition of a gasket 7, on the upper edge of a tank 8, which tank in combination with the said upper wall, forms the filter chamber 9. The tank 8 is provided with lateral inlet connection 10 adapted for connection to a supply pipe, not shown, through which the fluid to be filtered enters the filter. An outlet connection 9a in the form of an elbow is carried by the tank. The head and the tank are connected so that the outlet passage 6 is aligned with the upwardly extending branch of the outlet pipe connection 9a. The upper wall of the hollow head is dished with the concave side 11 facing upwardly, and this wall is traversed centrally by an orifice 12. The head is surmounted by a cover 13, the interior wall of which is also concave, and which has a peripheral flange 13a fixed by means of bolts 13b to the upper wall of the head. Between the cover 13 and the head, bolts 13b clamp a diaphragm 14 which divides the chamber between wall 11 and cover 13 into two compartments, the purpose of which will be hereinafter described. The tank 8 at its upper edges has lugs 15 carrying eye bolts 16 which engage slots in the peripheral flange of the cover 13. Wing nuts 17 are secured on the ends of the eye bolts 16 and serve to clamp the cover 13 and head 1 on the tank 8.

The holes 3 in the lower wall 2 of the head are engaged by tubular cores 18. Figure 1 shows the filter provided with the conventional filter columns. Each core 18 has a collar which is applied against the bottom of the wall 2 with interposition of a gasket washer. The core 18 has longitudinal slots 19 and carries a stack of washers 20 of filtering material. The free end of the core is engaged by the head of a threaded bolt 21 which is seated in an inturned flange of the core. The clamping of the washers is effected by means of a metal washer 23 and a nut 22 screwed onto the said bolt. The bolts 21 of all the filter columns constructed in this manner engage holes formed in a plate 24, which plate at its periphery is formed with holes for the passage of clamping bolts 25, the upper ends of which are anchored in the head 1. Wing nuts 26 on bolts 25 secure the plate 24 in position and cause it to exert an elastic clamping force on the columns through interposed compression coil springs 27. It will be seen that the filter columns are held in the holes 3 of the filter head by means of the plate 24 and wing nuts 26. Axial thrust is exerted between the springs 27 on each of the columns. To take down the apparatus, the tank is first removed from the head by unscrewing the wing nuts 17 and disengaging the bolts 16. Then the wing nuts 26 enable the plate 24 to be removed, giving access to the filter columns and enabling them to be withdrawn from the holes 3.

The operation of this filter is as follows: Assuming that the fluid to be filtered enters by the inlet connection 10, it will fill the tank 8 and flow uniformly from the outside to the interior, that is radially and edgewise of the filter discs, which therefore will hold back the impurities against their external circumference. The filtered fluid will flow through the tubular cores 18 into the inside cavity 4 of the hollow head from which it is discharged through the outlet passage 6 and the discharge connection 9a.

The diaphragm 14 is intended to effect automatic cleaning of the filter columns. It operates as follows:

In the case of new columns, the filter discs allow the fluid to pass relatively freely and in consequence, there is developed in the cavity 4 a certain pressure which operates through the hole 12 in the wall 11 and prevails in the chamber below the diaphragm, whereby the latter tends to rise towards the position shown in Figure 1. The diaphragm 14 is returned by its own elasticity and also by a compression spring 28 enclosed in a pocket in the cover 13, which spring acts on the upper surface of the diaphragm, and resists this pressure.

As the impurities accumulate on the outer circumference of the columns, the amount of fluid filtered diminishes and the pressure in the cavity 4 and passages communicating therewith is diminished. When it is considered necessary to clean the filter surfaces, the supply of fluid to be filtered is shut off, for example, by stopping the pump feeding the same and if desired, providing a by-pass for the said fluid. The diaphragm 14 under the action of its natural elasticity and the spring 28 will return to its normal mid-position, which movement is facilitated by providing an air inlet 29 in cover 13. The movement of the diaphragm 14 forces the fluid in the opposite direction. This fluid therefore traverses all the filter columns from the inside towards the outside thereby removing the impurities disposed on the outer circumference, which drop to the bottom of the tank, from which they can be discharged from time to time.

In the example shown, the diaphragm 14 has attached thereto a rod 30 guided in an opening in the covering. This rod may be graduated to serve as a visible indicator of the condition of the filter columns. Actually, the length of the rod projecting from the cover varies with the position of the diaphragm and consequently with the pressure prevailing in the cavity 4. Thus it gives a guide for determining the suitable time to effect cleaning of the filter columns.

Although this apparatus can operate with conventional filter columns in the manner described, it is a feature of the invention to provide this apparatus with filter columns such as shown in Figures 2 to 9.

In the example shown in Figure 2, the hollow core 31 is formed by a band of corrugated sheet metal, the corrugations of which are transversely slit at longitudinally spaced intervals and the portions of metal on opposite sides of the slits offset in opposite directions to provide openings 31a. The metal is rolled into tubular form and has its upper end fixed in a cap 32 with a flange 32a and a perforated top. The lower end of the core 31 is fixed in a cap 33 having a circumferential flange 33a and from which extends downwardly an axial stub rod 34. Between the flanges of the caps 32 and 33 there is wound a sheet 35 of filter paper or cardboard, or other suitable filtering material. The turns of the roll of filtering material thus formed are compressed by a series of elastic clamping rings 36 which may consist of helical springs with or without an inner split ring. The first and last of these clamping rings bear against the flange of the cap 32 and against a washer 37 on the stub rod 34. These columns are arranged in the filter chamber in the manner shown in Figure 1.

The cap 32 is inserted in one of the holes 3 of the lower wall 2 of the hollow head 1 and the stub rod 34 engages a hole in the plate 24. A cup washer 38 is mounted on rod 34 and a compression spring 27 is inserted between the top of this cup washer and the washer 37. The cup washer 38 is retained on the stub rod 34 by a resilient split ring 34a mounted in a peripheral groove in the stub rod 34.

In the embodiment shown in Figures 3 and 4 the construction in general is similar to that of Fig. 2, but the clamping rings 36 are replaced by a sheet metal clamp formed of two semi-cylindrical shells 39 having lateral lugs with holes therein traversed by clamping bolts 40 secured by means of nuts with the insertion of compression springs 40a to provide resilient clamping. The washers 37 and 38 are eliminated and the compression spring 27 is positioned directly between the plate 24 and the flange 33a of the lower cap 33. The shells 39 are made of corrugated sheet metal with slit openings 31a similar to the metal of cores 31. Furthermore, the shells 39 are connected to a lever mechanism 41 which can be operated from the outside of the tank 8 in such a manner as to shift the shells axially for cleaning the circumference of the filter roll.

In the embodiment of Figure 5 each column consists of a stack of similar circular discs each having a central opening by means of which they are strung on a tubular core 51 which is either slotted longitudinally or is perforated by a large number of orifices distributed laterally from one end to the other. This tubular core may be provided with caps such as caps 32 and 33 of Figs. 2 and 3 to enable it to be inserted in filtering apparatus as shown in Figure 1.

Each disc is made by stamping or in other suitable manner in the form of a dish with a conical or bulged bottom 52 with its outer edge bent towards the convex surface to form a shoulder 53 to which is connected a flat peripheral flange 54. The dimensions of the conical bottom and of the shoulder 53 are made such that the flange 54 will lie in a plane perpendicular to the axis of the disc at substantially the level of the inner peripheral edge of the conical bottom of the disc. For clearness, the front face of the disc is designated as the concave side of the conical bottom and the rear face, the convex side of the conical bottom.

In a disc thus shaped, the conical bottom 52 is bordered on its front face by an annular surface 55 which is substantially plane and in a plane perpendicular to the axis of the disc, whereas the flange 54 has on its rear face an annular surface 56 which is also plane and perpendicular to the said axis.

A number of these discs were stacked on the tubular core 51, each disc being reversed relatively to the next in such a manner that the first and second discs have their rear surfaces opposed and contact each other by the surfaces 56 of their flanges 54, while the second and third discs contact each other at the front annular surfaces 55 bordering the conical bottoms, the third and fourth by the annular surfaces 56 of the flanges 54 and so on. Thus there are obtained two series 57 and 58 of cells, all communicating freely with the central tubular core 51, while their communication with the exterior is opposed in the case of the series 57 by the joint 59 formed by the contact between the surfaces of the annular surfaces 56 of the flanges 54, and in the case of the series 58 by the joint 60 formed by contact of the annular areas 55 bordering the conical bottom 52 on the front surface of the discs.

The principle of the invention resides in preventing formation of a tight joint between the annular contact surfaces 55, 56, and in preparing these surfaces in such a manner that there will be an imperfectly sealed joint which will allow passage of the fluid to be filtered, but will retain the impurities, the filtering taking place from the exterior towards the interior as in the case of the filtering columns previously described.

As already indicated, the annular contact surfaces may be prepared for the purpose pointed out above in any suitable manner, the most simple being by abrasion in a direction substantially transverse or radial so as to produce grooves or scratches which will form between the contacting surfaces micrometric or capillary channels providing communication between the exterior and the cells 57 and 58 and consequently with the central tubular core 51. The size of the abrasive grains used to prepare these contact surfaces are selected to correspond with the size of the particles which are to be retained by the filter so that these particles will be deposited on the circumference of the flanges 54 and of the bottoms 52.

Cleaning of the filter surfaces can take place in the usual manner by effecting flow of the fluid in the direction opposite that for filtering, or by means of a cleaning sheath as hereinbefore described. The particles retained are thus detached and deposited in the bottom of the tank or casing in which the filter columns are mounted.

To prevent contact between the inner edges of the conical bottom 52 in the cells 57 of the first series, a number of small bosses 61 are formed projecting as lugs from the convex face of the discs at the places of contact adjacent the tubular core, which will prevent complete obstruction of the passage from the chamber 57 into the central core.

In the modification shown in Figure 7, each filter column is again formed by a stack of similar annular dished discs, the central openings of which are traversed by the tubular core 51 which may either be slotted or provided with a large number of lateral orifices distributed from end to end.

In this case, the annular peripheral portion of each disc is folded inwardly on one surface of the disc without touching said surface to provide a re-entrant flange portion 62 substantially perpendicular to the axis of the filter column. Flange 62 is on the rear or bottom side of the disc. The front or upwardly facing side of the disc has an annular peripheral surface 63 also substantially perpendicular to the axis, and of substantially the same dimensions as the flange 62, and the inner portion of the disc may be slightly offset or dished as shown at 64. The surfaces 62 and 63 are prepared as indicated hereinbefore by abrasion or similar treatment to give them the necessary grooves or scratches extending in a direction substantially radial or transverse relatively to the disc.

These discs are stacked on the tubular core 51 with all discs oriented or facing in the same direction, that is to say, the flange 62 on the rear side of each disc bears on the peripheral annular surface 63 of the upper front side of the next disc. Thus there is provided an imperfectly sealed joint between each of the contacting annular surfaces of the discs forming between them identical cells directly communicating with the interior of the central core. The operation is the same as that described for the filters of Figures 5 and 6. If desired, the abrasion may be effected on both faces of each disc.

In the form of construction illustrated in Figures 8, 8a and 9, each column is composed of a stack of similar circular discs having their circumferences formed in the manner shown in Figure 9, each disc having an equal number, preferably an even number, of rounded teeth spaced by rounded tooth gaps. These teeth which are preferably elastic are alternately bent upwards and downwards from the front and rear surfaces of the disc as indicated in Figure 8. For example, assuming that each disc is provided with the same number of even teeth 65 and odd teeth 66, the even teeth 65 are bent upwardly from the front of the discs and the odd teeth are bent downwardly from the rear surface of the disc. A notch 67 is formed in the edge of the central opening, adapted to engage a ridge 68 on the tubular core. This notch is so located that the discs stacked on the tubular core will be oriented with the even teeth 65 of all the discs exactly aligned from top to bottom of the column and the odd teeth 66 similarly aligned.

To assemble a column, it is necessary as in the example of Figure 5 to reverse alternate discs so that the first two will have their front surfaces opposed with an upwardly bent even tooth 65 of the lower first disc contacting the downwardly bent even tooth 65 of the next upper disc, while the second and third discs will have their rear surfaces opposed and will have an upwardly bent odd tooth 66 contacting a downwardly bent odd tooth 66, and so on. The teeth will bear against each other at their tips, initially, as shown in Figure 8. When the desired number of discs has been stacked on the core, the clamping nut will be tightened up so that all the discs on the core will be flattened (that is, all of the teeth of each disc will be bent back into the plane of the disc as in Fig. 8a) until they are in contact from their center openings outwardly to their tips. The clamping nut is then slackened slightly, by an amount determined to provide the desired micrometric spacing between the discs, as indicated in Figure 8a, which spacing is facilitated by the elasticity of the teeth whereby they tend to return to the condition shown in Figure 8.

By more or less loosening the pressure on the stack of discs after their complete flattening, it is possible to regulate at will the magnitude of the spaces between the discs (which communicate with the interior of the central tubular core) in accordance with the magnitude of the particles which it is desired to retain at the outer circumference of the discs, assuming always that the filtering takes place from the outside to the inside.

Other constructions of the filtering apparatus or of the filter columns made of a roll of filter material, as well as variations in the form of the discs, may be made without departing from the principles of the invention and the appended claims.

I claim:

1. A filter of the character described comprising a tank, a removable closure for said tank in the form of a hollow flat head having spaced upper and lower walls provided with at least one opening, at least one candle filter mounted in said tank and fitted in the opening of the lower wall, an inlet for supplying fluid to be filtered to said tank, an outlet for discharging filtered fluid from the space between the walls of the head, a removable cover on said head, enclosing between said cover and the upper wall of the head a chamber which communicates with the inside of the hollow head through the opening in its upper wall, and means acting in said chamber to produce a reverse flow of fluid from the inside of the head through the candle filter into the tank for cleaning said candle filter.

2. A filter as claimed in claim 1, in which the means acting in said chamber to produce a reverse flow of fluid from the inside of the head through the candle filter into the tank, for cleaning said candle filter, is a resilient diaphragm extending across said chamber and dividing it into an upper and lower compartment, the lower of which communicates with the inside of the hollow head through the opening in its upper wall, and the other of which communicates with the atmosphere through an opening in the cover, in combination with means acting on the diaphragm to urge it towards the upper wall of the head.

3. A filter as claimed in claim 2, in which the means acting on the diaphragm to urge it towards the upper wall of the head is a compression spring between the cover and the diaphragm.

4. A filter as claimed in claim 1, in which the means acting in said chamber to produce a reverse flow of fluid from the inside of the head through the candle filter into the tank, for cleaning said candle filter, is secured to a rod extending to the outside of the cover through an opening of this cover to indicate the position of said rod relative to said cover.

5. A filter as claimed in claim 1, in which the candle filter comprises a stack of solid discs with a central opening, having each a conical central portion with a concave front face and a convex rear face, a conical rim portion surrounding the central portion and bent toward the convex rear face of the central portion, a peripheral flat flange surrounding said rim and at right angles to the axis of the disc, and an annular plane surface at right angles to the axis of the disc on the front face at the juncture of the central portion and of the rim, said discs being grouped in pairs of successively opposed discs contacting each other alternately with the rear faces of the flanges and with the annular plane surfaces, said rear faces of the flanges and annular plane surfaces having thereon a plurality of irregularities to form an imperfect joint.

6. A filter according to claim 1, in which the candle filter comprises a perforated tubular core, a roll of filtering material surrounding said core, and resilient rings surrounding the roll of filtering material for retaining it in position about the core, said resilient rings being formed of annular helical coil springs.

7. A filter according to claim 1, in which the candle filter comprises a perforated tubular core, a roll of filtering material surrounding said core, two semi-cylindrical shells of perforated sheet metal surrounding the roll of filtering material, and resilient means for urging the two shells together.

8. A filter according to claim 1, in which the candle filter comprises a stack of non-porous discs of solid resilient material, each disc being of dish shape with a concave front face and a convex rear face, and having an annular peripheral plane surface on the concave side of the disc, the outer peripheral marginal portion of said plane surface being folded back upon itself to form an annular flange having a plane surface on the rear of the disc axially spaced from said annular peripheral plane surface on the front side of the disc, both of said annular surfaces being parallel, of substantially equal area, and at right angles to the axis of the disc, said annular surfaces being provided with minute radially extending grooves, and the discs being stacked with the annular surface on the front side of one disc in contact with the annular surface of the flange on the back side of another disc.

References Cited in the file of this patent
UNITED STATES PATENTS

| | | |
|---|---|---|
| 497,481 | Way | May 16, 1893 |
| 637,250 | Hall | Nov. 21, 1899 |
| 1,632,960 | Giese | June 21, 1927 |
| 1,875,022 | Krueger | Aug. 30, 1932 |
| 2,031,165 | Johnson | Feb. 18, 1936 |
| 2,083,148 | Couloumbe | June 8, 1937 |
| 2,570,132 | Koupal | Oct. 2, 1951 |
| 2,592,527 | Armstrong | Apr. 15, 1952 |
| 2,592,528 | Failmezger | Apr. 15, 1952 |